March 28, 1939.     G. F. McFADDEN     2,152,616
CUTTER ASSEMBLY
Filed April 13, 1937

INVENTOR
GEORGE F. McFADDEN
BY A. T. Sperry
ATTORNEY

Patented Mar. 28, 1939

2,152,616

UNITED STATES PATENT OFFICE 2,152,616

CUTTER ASSEMBLY

George F. McFadden, Roanoke, Va.

Application April 13, 1937, Serial No. 136,549

3 Claims. (Cl. 77—56)

This invention relates to cutter assemblies and, while being broadly applicable to cutters adapted for use in machine tools, it is here shown as particularly suitable for use in a boring bar, the invention being directed to the provision of an auxiliary backing member which is adapted to be used as a supplementary element to the cutter.

It is among the objects of the invention to provide means in a cutter assembly compensating for wear and grinding of the cutter so as to provide for longer life of the cutter element.

A further object of the invention is to provide means for artificially extending the length of the cutter element so that a standard cutter element may be used and artificially extended to compensate for various demands of the cutter body length.

A still further object is to provide means for artificially extending the length of the cutter element by an additional element of such form as to lend itself to the same minute adjustment as the cutter element.

Other objects and features will be apparent from a consideration of the following specification taken in conjunction with the drawing in which.

Figure 1:
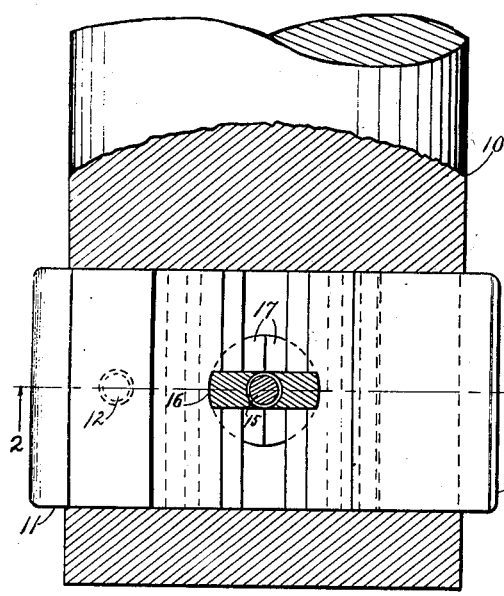
Figure 1 is a side elevation of a boring bar embodying the present invention partially in section.

The invention is shown as applied to a boring bar of conventional form and embodies the use of a backing member, which may receive the cutter, and which is so fitted thereto as to artificially extend the length of the cutter body for the purposes herein specified.

In that form of the invention herein depicted, the numeral 10 indicates a conventional, cylindrical boring bar which has, adjacent its end, a transverse slot within which are fitted cutter elements 11, which may be secured against accidental displacement by any suitable securing element, such as indicated by securing screws 12. The boring bar is also provided with a second, right angularly disposed, bore 13 which is reduced, as at 14, to receive a two-part adjusting mechanism including a threaded adjusting screw 15 and a cooperating, internally threaded, adjusting nut 16, which includes tapering flanges 17; the arrangement being such that, as the screw 15 is tightened, the nut 16 will be drawn inwardly and the flanges 17 will act to force outwardly the cutters 11. This produces a locking action between the flanges 17 and the screws 12 to secure the cutters in adjusted positions.

It is understood that applicant maintains no claim to the specific locking arrangement of the cutters, nor to the adjustment mechanism here shown, the same being susceptible of various modifications and adaptations to suit the design and test of the manufacturer. Variations in such elements are not deemed to be an avoidance of the scope and spirit of the claims appended hereto.

In former practice, it has been customary to use a solid cutter element extending from the cutting edge thereof back to an abutment with the adjusting flanges 17. As the cutter surface became worn, and was ground back to form and a new cutting edge, the screw 15 was adjusted to set the cutters further out to compensate for such grinding. Obviously in the course of time, the cutter would be ground to a size which would preclude its desired extension from the bar even though the adjusting screw had been set to its furthest position of outward adjustment. At such a time, the cutter would then have to be discarded and a new cutter take its place. Furthermore, it is obvious that the adjusting device provided only for minor adjustment, and for operations in which the cutter had to extend further from the bar, it was necessary to provide cutters of the length required.

In order to overcome the necessity for a multiplicity of sizes of cutters, and for the discarding of a cutter after it has been worn down only a friction of its entire length, applicant has provided a backing element which may be applied to the cutter so as to give it the desired length and to compensate for the wear and grinding of the cutter.

In carrying out this invention, applicant provides, at the rear of the cutter 11, a transverse slot 18, and reduces the thickness of the cutter to form a lip 19. The cutter is provided with a conventional transverse opening 20 which receives the side walls of the nut 16, the configuration of the opening being variable in accordance with the specific type of adjusting nut used.

Figure 2:
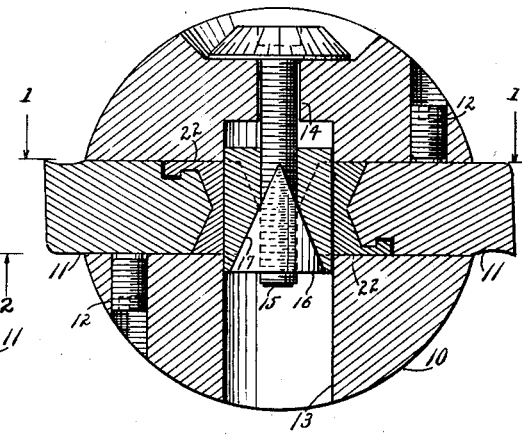
Figure 2 is a sectional view taken on line 2—2 of Figure 1.
Figure 3:
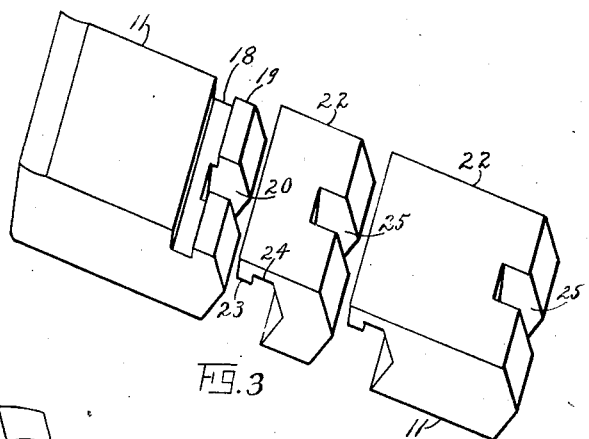
Figure 3 is a detail view of a cutter and the extension elements which may be applied thereto.
Figure 4:
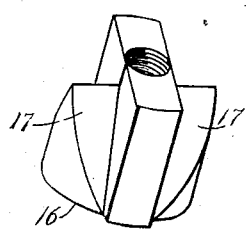
Figure 4 is a detail view of the adjusting nut.

With the cutter element in this form, it may be directly used in the boring bar, but, upon wear, should the cutter not extend as far as desired from the bar, a backing element 22 is applied. The element has a lip 23 adapted to be received in the slot 18 and a side wall 24 which fits over the lip 19. The cutter and the backing element thus assembled may be placed within the boring bar, as shown in Figure 2, and assembled in the same manner as if no backing piece was applied. The adjusting screw will have its same operative function for minor adjustments, the rear edge of the backing element having the same configuration as the back of the cutter and being provided with a recess 25 corresponding to the transverse opening 20 of the cutter. In Figure 3, there are shown two backing elements: the smaller one may be used to compensate for dimensions of the size of the cutter by grinding, while the series of larger ones, as illustrated, may be used to provide, from one standard size cutter, a plurality of lengths of cutters to accommodate for the normal requirement of having a whole set of different size cutters.

Obviously the backing members may be of an inexpensive material as compared with the high quality steel necessary in the cutter body itself. Thus the invention provides not only for adjustability and longer life for the cutters, but also diminishes the initial cost price for long cutters which are customarily formed solid of a more expensive material.

It is obvious that the present invention is not confined to this particular structure herein set forth and that numerous changes, and the full use of equivalents, may be resorted to without departing from the spirit and scope as outlined in the appended claims.

Having set forth the nature of my invention, what I claim is:

1. In a cutter assembly the combination of a holder and cutter element mounted therein, a removable backing element associated with the cutter and mounted in said holder therewith so as to cause said cutter to extend from said holder beyond its normal extension therefrom and means for inter-locking said cutter and said backing element.

2. In a boring bar a transverse aperture adapted to receive cutter elements, a second, right angularly disposed, aperture adapted to receive an adjusting mechanism, a pair of cutters extending from each end of the first mentioned aperture and a pair of backing elements, one interlockingly engaging each cutter and each engaging said adjusting mechanism whereby the said mechanism may impart adjustment, either inwardly or outwardly to said cutters.

3. In a cutter assembly the combination of a substantially rectangular cutter having an adjustor receiving recess in the back thereof, a transverse groove in one side thereof of a backing member having a like adjustor receiving recess in the back thereof and a side lip adapted to be received in the groove of said cutter to form an extension of longitudinal dimensions of said cutter.

GEORGE F. McFADDEN.